United States Patent
Sekhar (10) Patent No.: US 12,182,314 B2
(45) Date of Patent: Dec. 31, 2024

(54) METHOD AND SYSTEM FOR MANAGING DATA INSERTIONS

(71) Applicant: JPMorgan Chase Bank, N.A., New York, NY (US)

(72) Inventor: Devaraj Naga Chandra Sekhar, Bangalore (IN)

(73) Assignee: JPMORGAN CHASE BANK, N.A., New York, NY (US)

(*) Notice: Subject to any disclaimer, the term of this patent is extended or adjusted under 35 U.S.C. 154(b) by 304 days.

(21) Appl. No.: 17/944,635

(22) Filed: Sep. 14, 2022

(65) Prior Publication Data

US 2023/0123855 A1 Apr. 20, 2023

(30) Foreign Application Priority Data

Oct. 20, 2021 (IN) ............................. 202111047585

(51) Int. Cl.
  *G06F 21/64* (2013.01)
  *G06F 9/451* (2018.01)
  *G06F 9/54* (2006.01)

(52) U.S. Cl.
  CPC .............. *G06F 21/64* (2013.01); *G06F 9/451* (2018.02); *G06F 9/543* (2013.01)

(58) Field of Classification Search
  CPC ...................................................... G06F 21/64
  See application file for complete search history.

(56) References Cited

U.S. PATENT DOCUMENTS

| | | | |
|---|---|---|---|
| 12,032,546 B2 * | 7/2024 | Prasad | G06F 18/214 |
| 2020/0356695 A1 * | 11/2020 | Brannon | G06F 16/2379 |
| 2022/0383864 A1 * | 12/2022 | Gruber | G10L 15/1815 |

* cited by examiner

*Primary Examiner* — Simon P Kanaan
(74) *Attorney, Agent, or Firm* — GREENBLUM & BERNSTEIN, P.L.C.

(57) ABSTRACT

A method for facilitating data insertion management is disclosed. The method includes detecting a user input, the user input including a data insertion input; displaying, via a graphical user interface, a graphical element in response to the user input, the graphical element including a textual indicator and a user selectable option; compiling data that corresponds to the user input from temporary storage based on a user confirmation via the user selectable option; retrieving, via an application programming interface, the compiled data; determining, via a model based on a knowledge source, whether the compiled data includes a noncompliant data set; and automatically initiating an action based on a result of the determining.

20 Claims, 6 Drawing Sheets

METHOD AND SYSTEM FOR MANAGING DATA INSERTIONS

CROSS-REFERENCE TO RELATED APPLICATIONS

This application claims the benefit of Indian Provisional Patent Application No. 202111047585, filed Oct. 20, 2021, which is hereby incorporated by reference in its entirety.

BACKGROUND

1. Field of the Disclosure

This technology generally relates to methods and systems for managing data insertions, and more particularly to methods and systems for providing an in-browser solution to prevent data loss by facilitating automated data insertion monitoring and analysis.

2. Background Information

Many business entities rely on external connections to public networks such as, for example, the internet to enable daily business operations. Often, the external connections facilitate sensitive data loss via inattentive use of data insertion functions such as, for example, cut and paste functions. Historically, implementation of conventional data insertion management techniques has resulted in varying degrees of success with respect to effective and timely identification of potentially suspicious data sets to prevent data loss.

One drawback of using conventional data insertion management techniques is that in many instances, middleman routers are utilized to capture in-transit data packets via the external connections, which are frequently encrypted. As a result, conventional data insertion management techniques require decrypting and preprocessing of the in-transit data packets to extract the inserted data for analysis. Additionally, the in-transit data packets may only contain data specified by third-party software programs such as, for example, third-party web browsers. As such, limited metadata may be available for enhanced analysis of the data insertions.

Therefore, there is a need for an in-browser solution that prevents data loss by capturing user inserted data as plain text from temporary storage buffers to facilitate automated data insertion monitoring and analysis.

SUMMARY

The present disclosure, through one or more of its various aspects, embodiments, and/or specific features or sub-components, provides, inter alia, various systems, servers, devices, methods, media, programs, and platforms for providing an in-browser solution to prevent data loss by facilitating automated data insertion monitoring and analysis.

According to an aspect of the present disclosure, a method for facilitating data insertion management is disclosed. The method is implemented by at least one processor. The method may include detecting at least one user input, the at least one user input may include at least one data insertion input; displaying, via a graphical user interface, at least one graphical element in response to the at least one user input, the at least one graphical element may include a textual indicator and at least one user selectable option; compiling data that corresponds to the at least one user input from temporary storage based on a user confirmation via the at least one user selectable option; retrieving, via an application programming interface, the compiled data; determining, by using at least one model and at least one knowledge source, whether the compiled data includes at least one noncompliant data set; and automatically initiating at least one action based on a result of the determining.

In accordance with an exemplary embodiment, the data that corresponds to the at least one user input may be compiled as plain text.

In accordance with an exemplary embodiment, to determine whether the compiled data includes the at least one noncompliant data set, the method may further include parsing, by using the at least one model, the compiled data to identify at least one linguistic element that corresponds to at least one language, the at least one linguistic element may include at least one from among a word, a phrase, and a computer code; determining, by using the at least one model, a context for each of the at least one linguistic element; and determining, by using the at least one model and the at least one knowledge source, whether each of the at least one linguistic element includes the at least one noncompliant data set based on the corresponding context.

In accordance with an exemplary embodiment, the at least one noncompliant data set may include information that relates to at least one from among personally identifiable information and proprietary business information.

In accordance with an exemplary embodiment, the at least one action may include at least one from among a termination action, a further review action, and an allowed action, the further review action may correspond to a determination that the compiled data includes potentially noncompliant data.

In accordance with an exemplary embodiment, for automatically initiating the further review action, the method may further include automatically generating at least one ticket, the at least one ticket may include information that relates to at least one from among the result of the determining, the compiled data, user data, and the potentially noncompliant data; identifying at least one responsible party based on the information in the at least one ticket, the at least one responsible party may include at least one from among a supervisor, a manager, and a compliance team; and transmitting the at least one ticket to the identified at least one responsible party.

In accordance with an exemplary embodiment, the method may further include receiving feedback data from the at least one responsible party; and updating the at least one model and the at least one knowledge source based on the feedback data and the information in the at least one ticket.

In accordance with an exemplary embodiment, to update the at least one model and the at least one knowledge source, the method may further include identifying, from the received feedback data, at least one pattern for each of the at least one responsible party, the at least one pattern may relate to at least one from among an approval pattern and a rejection pattern; associating the at least one pattern with the corresponding at least one responsible party; and updating the at least one model and the at least one knowledge source based on the association and the at least one pattern.

In accordance with an exemplary embodiment, the at least one model may include at least one from among a machine learning model, a natural language processing model, a statistical model, a mathematical model, a process model, and a data model.

According to an aspect of the present disclosure, a computing device configured to implement an execution of a method for facilitating data insertion management is disclosed. The computing device including a processor; a memory; and a communication interface coupled to each of the processor and the memory, wherein the processor may be configured to detect at least one user input, the at least one user input may include at least one data insertion input; display, via a graphical user interface, at least one graphical element in response to the at least one user input, the at least one graphical element may include a textual indicator and at least one user selectable option; compile data that corresponds to the at least one user input from temporary storage based on a user confirmation via the at least one user selectable option; retrieve, via an application programming interface, the compiled data; determine, by using at least one model and at least one knowledge source, whether the compiled data includes at least one noncompliant data set; and automatically initiate at least one action based on a result of the determining.

In accordance with an exemplary embodiment, the processor may be further configured to compile the data that corresponds to the at least one user as plain text.

In accordance with an exemplary embodiment, to determine whether the compiled data includes the at least one noncompliant data set, the processor may be further configured to parse, by using the at least one model, the compiled data to identify at least one linguistic element that corresponds to at least one language, the at least one linguistic element may include at least one from among a word, a phrase, and a computer code; determine, by using the at least one model, a context for each of the at least one linguistic element; and determine, by using the at least one model and the at least one knowledge source, whether each of the at least one linguistic element includes the at least one noncompliant data set based on the corresponding context.

In accordance with an exemplary embodiment, the at least one noncompliant data set may include information that relates to at least one from among personally identifiable information and proprietary business information.

In accordance with an exemplary embodiment, the at least one action may include at least one from among a termination action, a further review action, and an allowed action, the further review action may correspond to a determination that the compiled data includes potentially noncompliant data.

In accordance with an exemplary embodiment, to automatically initiate the further review action, the processor may be further configured to automatically generate at least one ticket, the at least one ticket may include information that relates to at least one from among the result of the determining, the compiled data, user data, and the potentially noncompliant data; identify at least one responsible party based on the information in the at least one ticket, the at least one responsible party may include at least one from among a supervisor, a manager, and a compliance team; and transmit the at least one ticket to the identified at least one responsible party.

In accordance with an exemplary embodiment, the processor may be further configured to receive feedback data from the at least one responsible party; and update the at least one model and the at least one knowledge source based on the feedback data and the information in the at least one ticket.

In accordance with an exemplary embodiment, to update the at least one model and the at least one knowledge source, the processor may be further configured to identify, from the received feedback data, at least one pattern for each of the at least one responsible party, the at least one pattern may relate to at least one from among an approval pattern and a rejection pattern; associate the at least one pattern with the corresponding at least one responsible party; and update the at least one model and the at least one knowledge source based on the association and the at least one pattern.

In accordance with an exemplary embodiment, the at least one model may include at least one from among a machine learning model, a natural language processing model, a statistical model, a mathematical model, a process model, and a data model.

According to an aspect of the present disclosure, a non-transitory computer readable storage medium storing instructions for facilitating data insertion management is disclosed. The storage medium including executable code which, when executed by a processor, may cause the processor to detect at least one user input, the at least one user input may include at least one data insertion input; display, via a graphical user interface, at least one graphical element in response to the at least one user input, the at least one graphical element may include a textual indicator and at least one user selectable option; compile data that corresponds to the at least one user input from temporary storage based on a user confirmation via the at least one user selectable option; retrieve, via an application programming interface, the compiled data; determine, by using at least one model and at least one knowledge source, whether the compiled data includes at least one noncompliant data set; and automatically initiate at least one action based on a result of the determining.

In accordance with an exemplary embodiment, the at least one action may include at least one from among a termination action, a further review action, and an allowed action, the further review action may correspond to a determination that the compiled data includes potentially noncompliant data.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
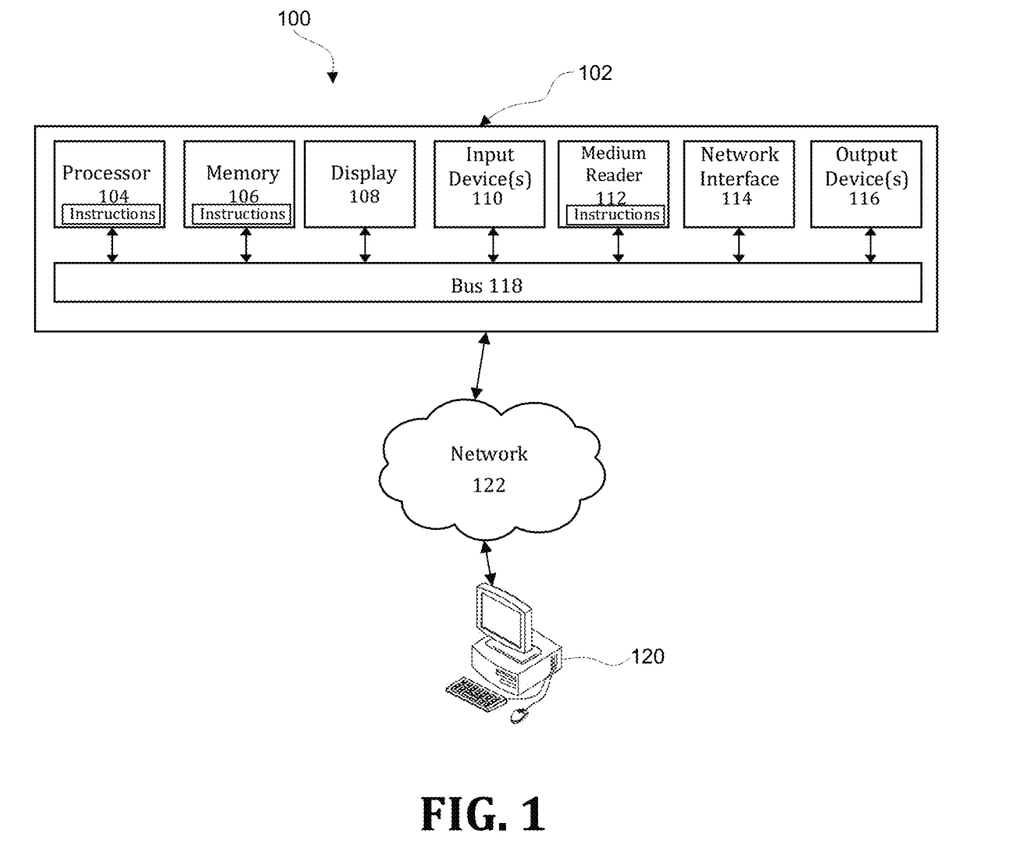
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing an in-browser solution to prevent data loss by facilitating automated data insertion monitoring and analysis.

Figure 2:
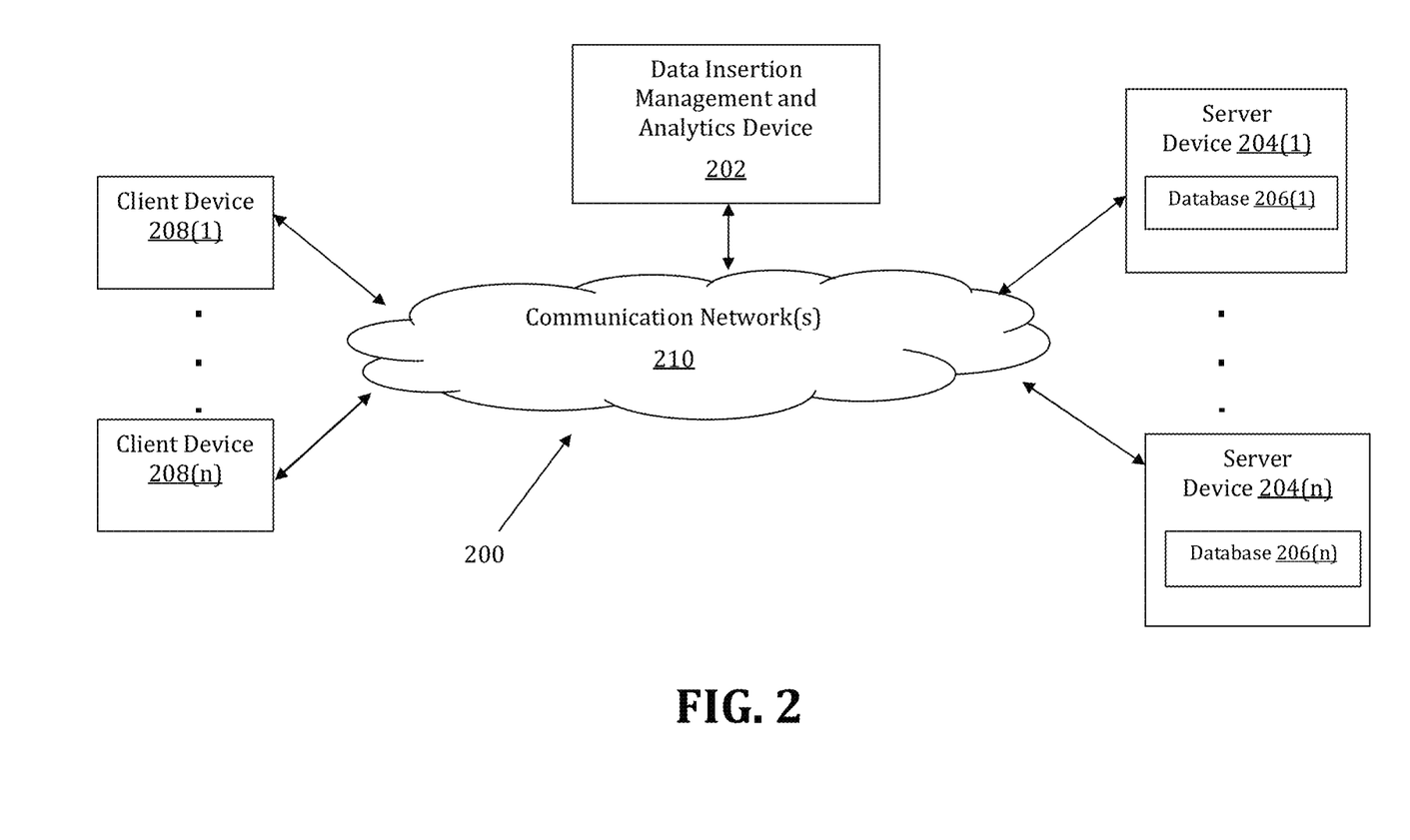
FIG. 2 illustrates an exemplary diagram of a network environment.

Referring to FIG. 2, a schematic of an exemplary network environment 200 for implementing a method for providing an in-browser solution to prevent data loss by facilitating automated data insertion monitoring and analysis is illustrated. In an exemplary embodiment, the method is executable on any networked computer platform, such as, for example, a personal computer (PC).

The method for providing an in-browser solution to prevent data loss by facilitating automated data insertion monitoring and analysis may be implemented by a Data Insertion Management and Analytics (DIMA) device 202. The DIMA device 202 may be the same or similar to the computer system 102 as described with respect to FIG. 1. The DIMA device 202 may store one or more applications that can include executable instructions that, when executed by the DIMA device 202, cause the DIMA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DIMA device 202 itself, may be located in virtual server(s) running in a cloud-based computing environment rather than being tied to one or more specific physical network computing devices. Also, the application(s) may be running in one or more virtual machines (VMs) executing on the DIMA device 202. Additionally, in one or more embodiments of this technology, virtual machine(s) running on the DIMA device 202 may be managed or supervised by a hypervisor.

In the network environment 200 of FIG. 2, the DIMA device 202 is coupled to a plurality of server devices 204(1)-204(n) that hosts a plurality of databases 206(1)-206(n), and also to a plurality of client devices 208(1)-208(n) via communication network(s) 210. A communication interface of the DIMA device 202, such as the network interface 114 of the computer system 102 of FIG. 1, operatively couples and communicates between the DIMA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DIMA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DIMA devices that efficiently implement a method for providing an in-browser solution to prevent data loss by facilitating automated data insertion monitoring and analysis.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DIMA device 202 may be a standalone device or integrated with one or more other devices or apparatuses, such as one or more of the server devices 204(1)-204(n), for example. In one particular example, the DIMA device 202 may include or be hosted by one of the server devices 204(1)-204(n), and other arrangements are also possible. Moreover, one or more of the devices of the DIMA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DIMA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to user inputs, graphical elements, textual indicators, user selectable options, temporary storage data, user confirmations, compiled data, machine learning models, knowledge sources, and automatically initiated actions.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DIMA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DIMA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DIMA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DIMA device 202, the server devices 204(1)-204(n), or the client devices 208(1)-208(n), for example, may be configured to operate as virtual instances on the same physical machine. In other words, one or more of the DIMA device 202, the server devices 204(1)-204(n), or the client devices 208(1)-208(n) may operate on the same physical device rather than as separate devices communicating through communication network(s) 210. Additionally, there may be more or fewer DIMA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
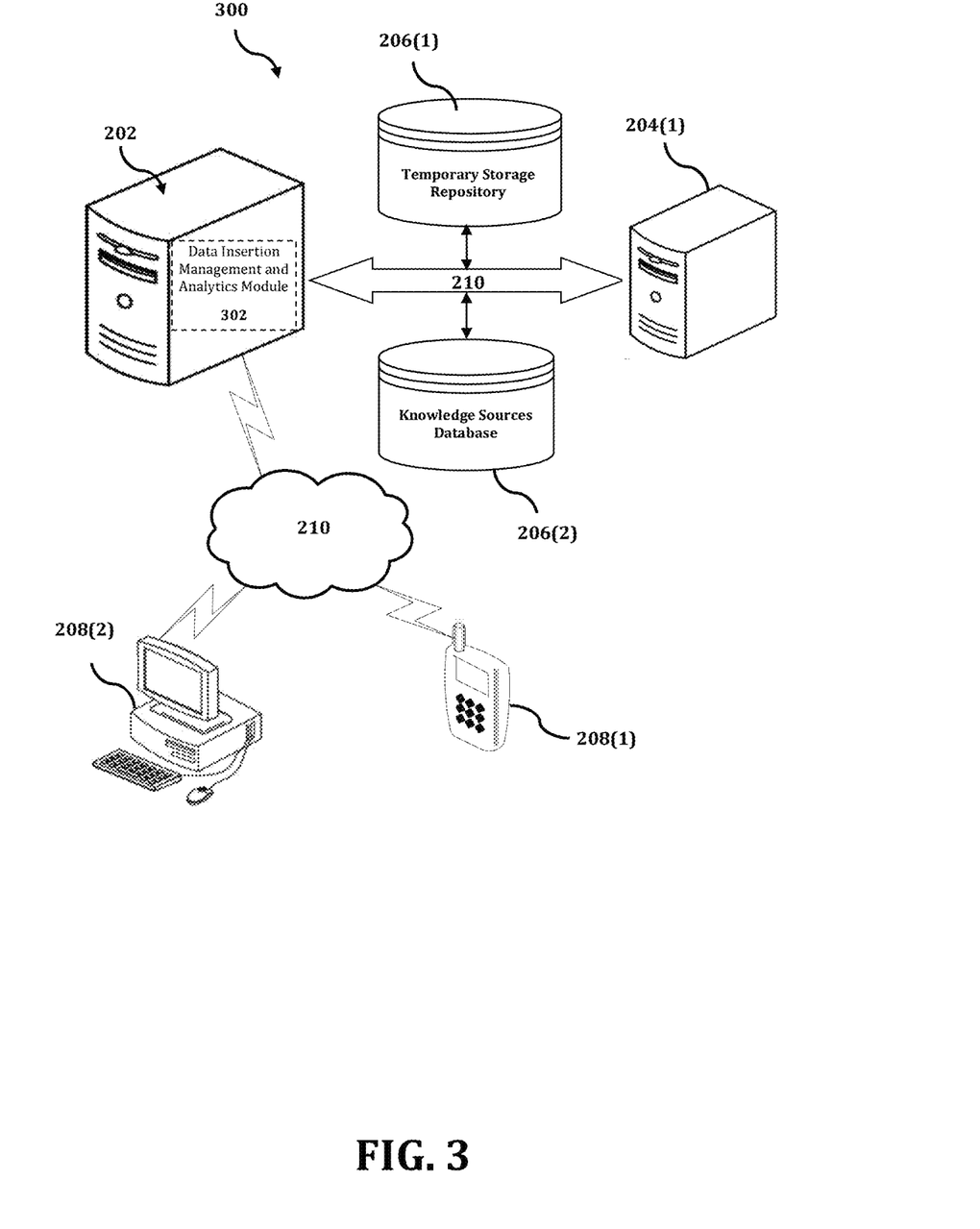
FIG. 3 shows an exemplary system for implementing a method for providing an in-browser solution to prevent data loss by facilitating automated data insertion monitoring and analysis.

The DIMA device 202 is described and shown in FIG. 3 as including a data insertion management and analytics module 302, although it may include other rules, policies, modules, databases, or applications, for example. As will be described below, the data insertion management and analytics module 302 is configured to implement a method for providing an in-browser solution to prevent data loss by facilitating automated data insertion monitoring and analysis.

An exemplary process 300 for implementing a mechanism for providing an in-browser solution to prevent data loss by facilitating automated data insertion monitoring and analysis by utilizing the network environment of FIG. 2 is shown as being executed in FIG. 3. Specifically, a first client device 208(1) and a second client device 208(2) are illustrated as being in communication with DIMA device 202. In this regard, the first client device 208(1) and the second client device 208(2) may be "clients" of the DIMA device 202 and are described herein as such. Nevertheless, it is to be known and understood that the first client device 208(1) and/or the second client device 208(2) need not necessarily be "clients" of the DIMA device 202, or any entity described in association therewith herein. Any additional or alternative relationship may exist between either or both of the first client device 208(1) and the second client device 208(2) and the DIMA device 202, or no relationship may exist.

Further, DIMA device 202 is illustrated as being able to access a temporary storage repository 206(1) and a knowledge sources database 206(2). The data insertion management and analytics module 302 may be configured to access these databases for implementing a method for providing an in-browser solution to prevent data loss by facilitating automated data insertion monitoring and analysis.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DIMA device 202 via broadband or cellular communication. Of course, these embodiments are merely exemplary and are not limiting or exhaustive.

Upon being started, the data insertion management and analytics module 302 executes a process for providing an in-browser solution to prevent data loss by facilitating automated data insertion monitoring and analysis. An exemplary process for providing an in-browser solution to prevent data loss by facilitating automated data insertion monitoring and analysis is generally indicated at flowchart 400 in FIG. 4.

Figure 4:
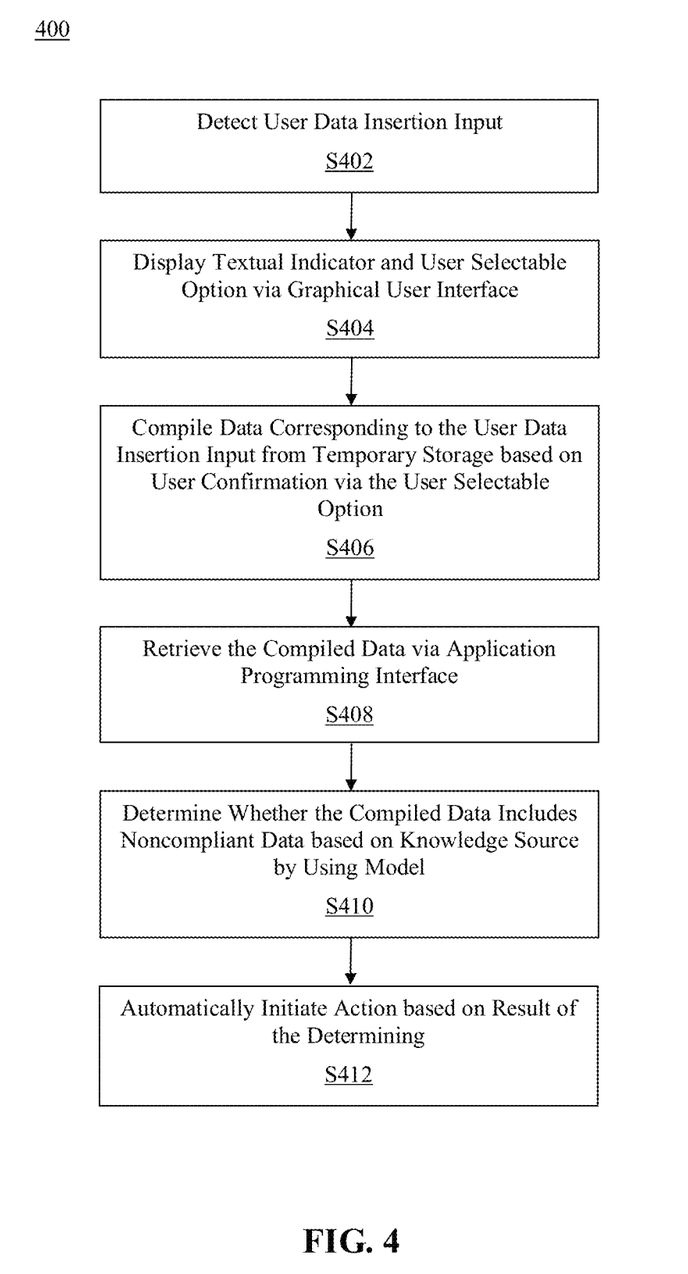
FIG. 4 is a flowchart of an exemplary process for implementing a method for providing an in-browser solution to prevent data loss by facilitating automated data insertion monitoring and analysis.

In the process 400 of FIG. 4, at step S402, a user input may be detected. The user input may include a data insertion input. In an exemplary embodiment, the data insertion input may relate to an insertion function. The insertion function may enable the user to paste textual and graphical elements that have previously been copied. In another exemplary embodiment, the data insertion input may relate to an upload of an electronic document that contains business related data. The electronic document may include an associated characteristic that determines the privacy level of the electronic document.

In another exemplary embodiment, the insertion functions such as, for example, cut, copy, and paste may relate to commands that offer an inter-process communication technique for transferring data through a computer's user interface. The cut command may remove the selected data from an original position. The copy command may create a duplicate copy of the selected data. Both the cut command and the copy command may temporarily store the selected data in a buffer such as, for example, a clipboard that facilitates short-term storage and transfer of data within and between application programs. Then, the past function may insert the data that has been temporarily stored in the buffer.

In another exemplary embodiment, the data insertion input may include an interaction between the user and a graphical element such as a menu. The graphical element may include user selectable choices that initiates a corresponding function when selected. For example, the user may right click on an input device such as a mouse to interact with a menu item to initiate a paste function. In another exemplary embodiment, the data insertion input may include a series of one and/or several keys that invoke a software program to perform a preprogrammed action. The series of one and/or several keys may correspond to a keyboard shortcut that is a part of the standard functionality of the operating system and/or application program as well as a part of customized software codes written by the user in a scripting language. For example, the user may select a CTRL button and a V button on the keyboard to initiate a paste function.

In another exemplary embodiment, the user input may be detected by a software component such as, for example, a plugin that adds a specific feature to an existing computer program. The plugin may add specific features consistent with disclosures in the present application to an application software such as, for example, a web browser that is usable for accessing the world wide web. The plugin may automatically operate as a background process without requiring user intervention.

In another exemplary embodiment, the plugin may include a list of allowable functions based on a website that is accessed by the web browser. For example, the list of allowable functions may indicate that a paste function is not allowed on a specific website that has not been preauthorized. In an exemplary embodiment, the plugin may be automatically included in software packages for implementation on user devices. Access to the administrative functions of the plugin may be restricted to authorized personnel to prevent unauthorized changes. In another exemplary embodiment, the plugin may connect with user directories to automatically retrieve corresponding user profile data. The retrieved profile data may include a user authorization characteristic that enables predetermined functions on predetermined websites according to a predetermined guideline. For example, a user with a high authorization permission may initiate a paste function on a certain website whereas a user with a low authorization permission may not.

At step S404, a graphical element may be displayed via a graphical user interface in response to the user input. The graphical element may include a textual indicator and user selectable options. In an exemplary embodiment, the graphical element may include a graphical user interface display area such as, for example, a pop-up that can appear in the foreground of the visual interface as a window in different sizes and screen positions. The pop-up may correspond to a confirmation dialog box that is usable to communicate with the user.

In another exemplary embodiment, the graphical element may include a textual indicator and user selectable options for the user to confirm an action. For example, to confirm initiation of a paste function, the textual indicator may include a message such as "do you want to continue your paste action? If yes, the action will be recorded" and the selectable options may include a "yes" option and a "no" option. Selection of the "yes" option affirms that the user intends to proceed with the paste function and selection of the "no" option ends the initiation of the paste function. Selection of the "yes" function enables the user to insert data consistent with disclosures in the present application.

At step S406, data that corresponds to the user input may be compiled from temporary storage based on a user confirmation via the user selectable options. The data may include data that the user has selected and temporarily stored via a cut and/or paste function consistent with disclosures in the present application. In an exemplary embodiment, the temporary storage may include a buffer such as, for example, a clipboard that is provided by an operating system to facilitate short-term storage and transfer of data within an application as well as between various applications. The clipboard may include temporary and unnamed data that is persisted in the random-access memory (RAM) of the computing device.

In another exemplary embodiment, the data that corresponds to the user input may be compiled as plain text. The plain text may correspond to text that is not computationally tagged, specifically formatted, and/or written in code. As will be appreciated by a person of ordinary skill in the art, the applications may communicate through the clipboard by providing either serialized representations of a data object and/or a promise for larger data objects. The clipboard may translate and process incoming data to facilitate storage requirements.

At step S408, the compiled data may be retrieved via an application programming interface (API). The compiled data may be retrieved from the temporary storage via the API to facilitate additional processing of the user input. In an exemplary embodiment, the API may correspond to a connection between computer programs. The API may relate to a software interface that offers a service to other pieces of software. In another exemplary embodiment, the API may correspond to a software architectural style such as, for example, a representational state transfer (REST) architectural style that defines a set of constraints for how the architecture of an internet-scale distributed hypermedia system should behave. The REST architectural style may emphasize the scalability of interactions between components, uniform interfaces, independent deployment of components, and the creation of a layered architecture.

At step S410, a model may determine whether the compiled data includes a noncompliant data set. The model may utilize a knowledge source to make the determination. In an exemplary embodiment, the noncompliant data set may correspond to a data set that includes sensitive data. The sensitive data may relate to data that a business entity would not want a third-party to be in possession of. For example, the sensitive data may include information that relates to at least one from among proprietary business information, client secured data that includes personally identifiable information, and nondisclosure agreement related data. As will be appreciated by a person of ordinary skill in the art, the model may input the compiled data and knowledge source data to output a determination based on data patterns.

In another exemplary embodiment, the model may include at least one from among a machine learning model, a natural language processing model, a statistical model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, 5-fold cross-validation analysis, balanced class weight analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, the natural language processing model may correspond to a plurality of natural language processing techniques. The natural language processing techniques may include at least one from among a sentiment analysis technique, a named entity recognition technique, a summarization technique, a topic modeling technique, a text classification technique, a keyword extraction technique, and a lemmatization and stemming technique. As will be appreciated by a person of ordinary skill in the art, natural language processing may relate to computer processing and analyzing of large quantities of natural language data.

In another exemplary embodiment, to determine whether the compiled data includes the noncompliant data set, the compiled data may be parsed to identify linguistic elements that correspond to a language. The compiled data may be parsed in real-time by using the model. In another exemplary embodiment, the language may correspond to a structured mode of communication between various entities such as, for example, people and computing systems. The language may include a natural language format such as, for example, an English language format. The language may also include a computing language format such as, for example, a source code format. Consistent with present disclosures, the linguistic elements may include at least one from among a word, a phrase, and a computer code that correspond to the language.

Then, a context for each of the linguistic elements may be determined by using the model. The context may relate to circumstances that form the setting for an event, statement, and/or idea in terms in which the setting may be understood and assessed. For example, a determined context for a copied phrase that includes a series of numbers may indicate that the series of numbers relate to a customer account number. Finally, a determination may be made as to whether each of the linguistic elements includes the noncompliant data set. The determination may be made in real-time based on the corresponding context by using the model and the knowledge source. Consistent with present disclosures, the noncompliant data set may include information that relates to at least one from among personally identifiable information and proprietary business information. For example, the personally identifiable information may include customer information such as a customer account number and a customer phone number.

In another exemplary embodiment, a model may determine whether the compiled data includes a compliant data set. The model may utilize a knowledge source such as, for example, a compliant knowledge source to make the determination. In another exemplary embodiment, the compliant data set may correspond to a data set that includes data which have been predetermined to not include sensitive information. The non-sensitive data may relate to data that is commonly available to the public and/or a part of common knowledge. For example, the non-sensitive data may include information that corresponds to base codes of an open-source software program. As will be appreciated by a person of ordinary skill in the art, the model may input the compiled data and knowledge source data to output a determination based on data patterns.

In another exemplary embodiment, consistent with present disclosures, the knowledge source may be updated to include additional compliant data sets. The knowledge source may be updated based on feedback received from an authorized user. For example, after data set A has been determined by the authorized user to be compliant, the knowledge source may be updated to include data set A as a compliant data set. The knowledge source may also be automatically updated by the model according to detected usage patterns. For example, based on a consistent pattern of approvals for data set B, the model may determine that data set B corresponds to a compliant data set and updates the knowledge source accordingly.

At step S412, an action may be automatically initiated based on a result of the determining. In an exemplary embodiment, the action may include at least one from among a termination action, a further review action, and an allowed action. The termination action may correspond to a termination of an initiated function such as, for example, the paste function. The further review action may correspond to a determination that the compiled data includes potentially noncompliant data. The allowed action may correspond to completion of an initiated function such as, for example, the paste function. In another exemplary embodiment, the action may be automatically initiated without additional user input. For example, when a determination is made that the compiled data includes potentially noncompliant data, the further review action may be automatically initiated without further input from the user.

In another exemplary embodiment, automatically initiating the further review action may include automatically generating a ticket. The ticket may include information that relates to at least one from among the result of the determining, the compiled data, user data, and the potentially noncompliant data. Then, a responsible party may be identified based on the information in the ticket. The responsible party may include at least one from among a supervisor of the user, a manager of the user, and a compliance team. The ticket may be transmitted to the identified responsible party.

In another exemplary embodiment, feedback data may be received from the responsible party. The feedback data may include information that relates to the accuracy of the determination by the model as well as a resolution of the data insertion function. For example, the responsible party may indicate in the feedback data that the potentially noncompliant data was actually in compliance with predetermined business guidelines. The feedback data may be received directly from the responsible party via a graphical user interface as well as indirectly via captured data from a data stream. Then, the model and the knowledge source may be updated based on the feedback data and the information in the ticket. As will be appreciated by a person of ordinary skill in the art, the model may be updated consistent with disclosures in the present application based on the type of the model used, such as, for example, a machine learning model.

In another exemplary embodiment, to update the model and the knowledge source, patterns may be identified for each of the responsible parties. The patterns may be identified from the received feedback data and may relate to at least one from among an approval pattern and a rejection pattern. In another exemplary embodiment, the approval patterns may correspond to a pattern of consistent approval of a particular type of compiled data. For example, the approval patterns may indicate that compiled data relating to a particular set of background code are consistently approved by the corresponding responsible party. In another exemplary embodiment, the rejection patterns may correspond to a pattern of consistent rejection of a particular type of compiled data. For example, the rejection patterns may indicate that compiled data relating to a particular set of proprietary code are consistently rejected by the corresponding responsible party.

Then, the determined patterns may be associated with the corresponding responsible parties. The determined patterns may be associated with each of the corresponding responsible parties by using a record of user-specific data such as, for example, a user profile. Finally, the model and the knowledge source may be updated based on the association and the patterns. Consistent with present disclosures, the associations and the patterns may reduce the number of authorizations required from the responsible parties for a particular type of compiled data. For example, a particular supervisor would not be repeatedly asked to approve a generic code each time the generic code is copied and pasted. Based on an approval pattern of the particular supervisor, subsequent copy and paste functions involving the generic code may be automatically approved.

Figure 5:
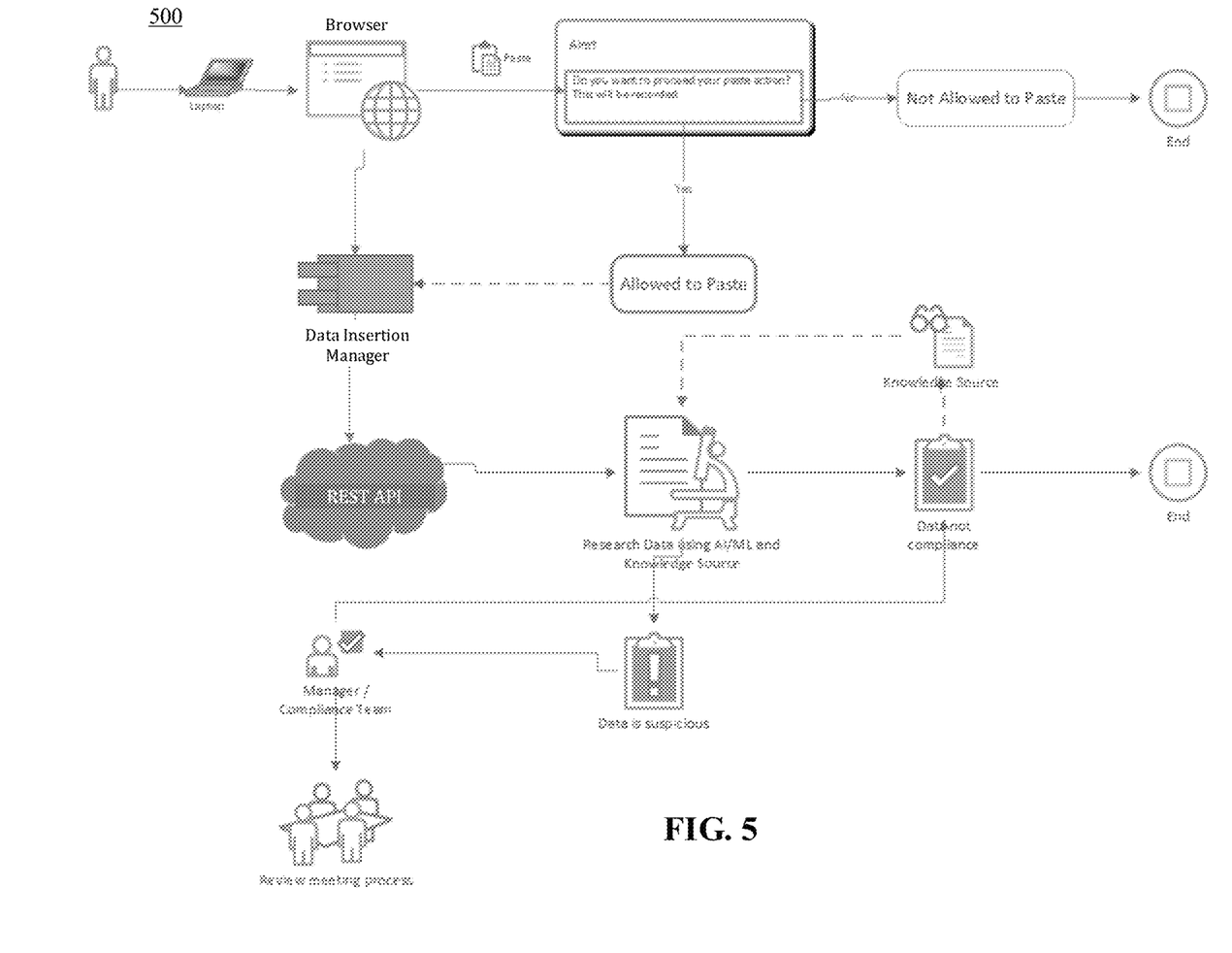
FIG. 5 is an architecture diagram of an exemplary process for implementing a method for providing an in-browser solution to prevent data loss by facilitating automated data insertion monitoring and analysis.

FIG. 5 is an architecture diagram 500 of an exemplary process for implementing a method for providing an in-browser solution to prevent data loss by facilitating automated data insertion monitoring and analysis. In FIG. 5, a particular implementation of the claimed invention is disclosed. Consistent with disclosures in the present application, a plugin corresponding to the claimed invention has been installed in a web browser of a user computing device to facilitate the automated data insertion monitoring and analysis.

As illustrated in FIG. 5, a user interacts with a computing device such as, for example, a laptop to access a website via the web browser. The user may access a variety of websites via the web browser. When the user accesses a whitelisted website that has been preauthorized, the user may initiate any function such as, for example, an upload function, a cut function, a copy function, and a paste function. However, when the user accesses a nonauthorized website, functionalities previously described may be limited for the user.

On a nonauthorized website, an alert window may be generated and presented to the user upon initiation of a functionality such as, for example, the paste functionality. The alert window may require confirmation from that user that the user intended to initiate the functionality. When the user indicated that the user does not intend to initiate the functionality, the functionality is terminated. However, when the user positively indicates that the initiation of the functionality is intentional, data that relates to the user input may be compiled and the functionality is allowed to proceed.

The compiled user input data may be retrieved via a representational state transfer (REST) application programming interface (API). The compiled user input data may be automatically analyzed by a machine learning model consistent with disclosures in the present application. The machine learning model may utilize a knowledge source and the compiled user input data to determine whether the compiled user input data includes noncompliant data. Automated actions may be initiated based on a result of the determining by the model.

An allowed action may be initiated when the model determines that the user input data does not include noncompliant data. A terminated action may be initiated when the model determines with a certainty that the user input data does include noncompliant data. The level of certainty may be based on a predetermined threshold that is manually and/or automatically adjusted.

A further review action may be initiated when the model determined that the user input data included potentially noncompliant data. The further review action may generate a ticket, which includes information relating to the user input data and the potentially noncompliant data. The ticket may be transmitted to a responsible party such as, for example, a manager of the user, a supervisor of the user, and a compliance team. The compliance team may initiate a review meeting process to assess the potentially noncompliant data. Consistent with disclosures in the present application, feedback from the responsible party may be retrieved and used to update the machine learning model and the knowledge source.

Figure 6:
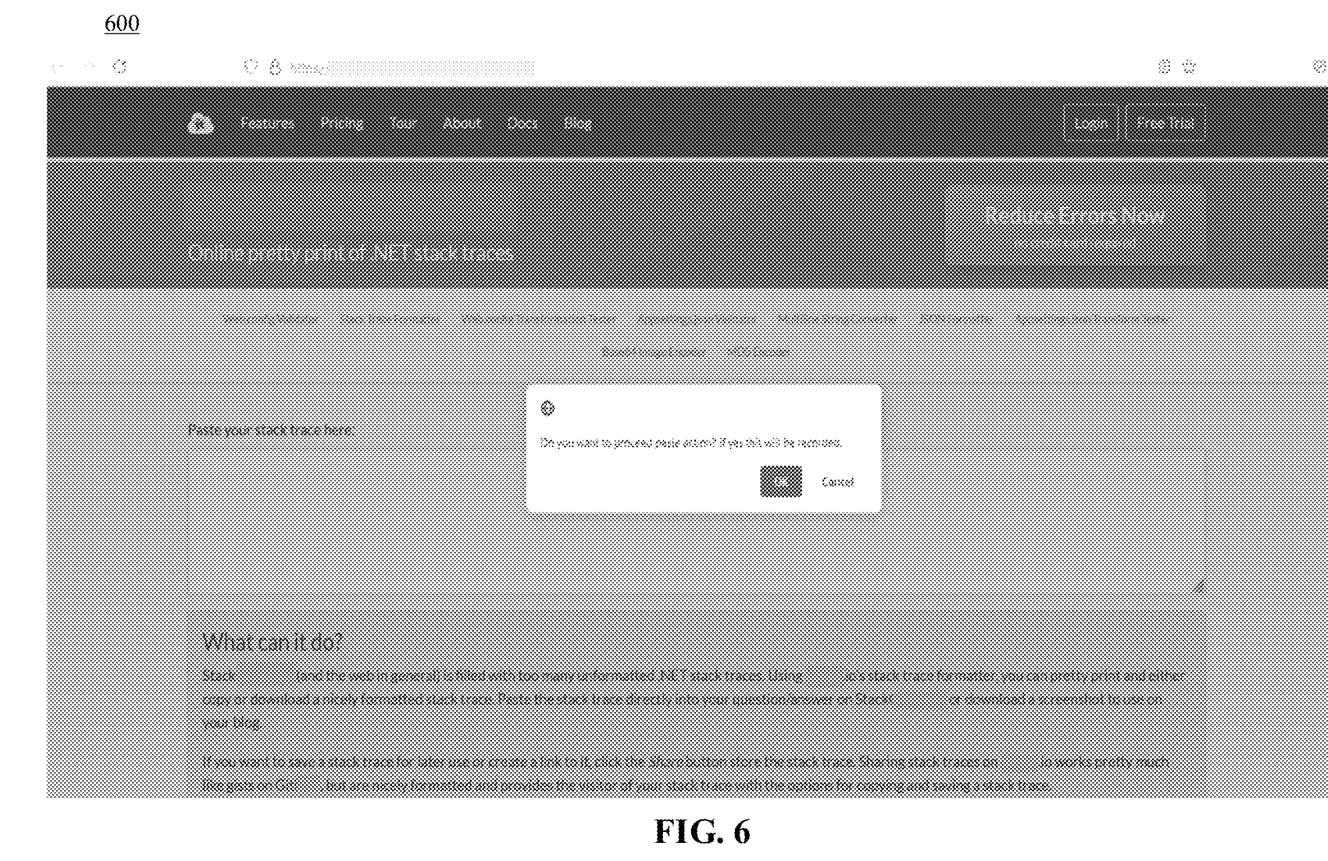
FIG. 6 is a screen shot that illustrates a graphical user interface that is usable for implementing a method for providing an in-browser solution to prevent data loss by facilitating automated data insertion monitoring and analysis, according to an exemplary embodiment.

FIG. 6 is a screen shot 600 that illustrates a graphical user interface that is usable for implementing a method for providing an in-browser solution to prevent data loss by facilitating automated data insertion monitoring and analysis, according to an exemplary embodiment. In FIG. 6, the user has attempted to initiate a functionality such as, for example, a paste functionality on an unapproved website. Consistent with disclosures in the present application, a confirmation dialog box may be generated and displayed for the user. The confirmation dialog box may request confirmation from the user that the initiated functionality was intentional.

As illustrated in FIG. 6, the confirmation dialog box may ask the user "do you want to proceed paste action? If yes, this will be recorded." The confirmation dialog box may also include user selectable options such as, for example, a "yes" option to confirm intentional initiation and a "no" option to deny intentional initiation. The claimed invention may then proceed consistent with disclosures in the present application based on a selection by the user.

Accordingly, with this technology, an optimized process for providing an in-browser solution to prevent data loss by facilitating automated data insertion monitoring and analysis is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating data insertion management, the method being implemented by at least one processor, the method comprising:
    detecting, by the at least one processor, at least one user input, the at least one user input including at least one data insertion input;
    displaying, by the at least one processor via a graphical user interface, at least one graphical element in response to the at least one user input, the at least one graphical element including a textual indicator and at least one user selectable option;
    compiling, by the at least one processor, data that corresponds to the at least one user input from temporary storage based on a user confirmation via the at least one user selectable option;
    retrieving, by the at least one processor via an application programming interface, the compiled data;
    determining, by the at least one processor using at least one model and at least one knowledge source, whether the compiled data includes at least one noncompliant data set; and
    automatically initiating, by the at least one processor, at least one action based on a result of the determining.

2. The method of claim 1, wherein the data that corresponds to the at least one user input is compiled as plain text.

3. The method of claim 1, wherein determining whether the compiled data includes the at least one noncompliant data set further comprises:
    parsing, by the at least one processor using the at least one model, the compiled data to identify at least one linguistic element that corresponds to at least one language, the at least one linguistic element including at least one from among a word, a phrase, and a computer code;
    determining, by the at least one processor using the at least one model, a context for each of the at least one linguistic element; and
    determining, by the at least one processor using the at least one model and the at least one knowledge source, whether each of the at least one linguistic element includes the at least one noncompliant data set based on the corresponding context.

4. The method of claim 3, wherein the at least one noncompliant data set includes information that relates to at least one from among personally identifiable information and proprietary business information.

5. The method of claim 1, wherein the at least one action includes at least one from among a termination action, a further review action, and an allowed action, the further review action corresponding to a determination that the compiled data includes potentially noncompliant data.

6. The method of claim 5, wherein automatically initiating the further review action further comprises:
    automatically generating, by the at least one processor, at least one ticket, the at least one ticket including information that relates to at least one from among the result of the determining, the compiled data, user data, and the potentially noncompliant data;
    identifying, by the at least one processor, at least one responsible party based on the information in the at least one ticket, the at least one responsible party including at least one from among a supervisor, a manager, and a compliance team; and transmitting, by the at least one processor, the at least one ticket to the identified at least one responsible party.

7. The method of claim 6, further comprising:
receiving, by the at least one processor, feedback data from the at least one responsible party; and
updating, by the at least one processor, the at least one model and the at least one knowledge source based on the feedback data and the information in the at least one ticket.

8. The method of claim 7, wherein updating the at least one model and the at least one knowledge source further comprises:
identifying, by the at least one processor from the received feedback data, at least one pattern for each of the at least one responsible party, the at least one pattern relating to at least one from among an approval pattern and a rejection pattern;
associating, by the at least one processor, the at least one pattern with the corresponding at least one responsible party; and
updating, by the at least one processor, the at least one model and the at least one knowledge source based on the association and the at least one pattern.

9. The method of claim 1, wherein the at least one model includes at least one from among a machine learning model, a natural language processing model, a statistical model, a mathematical model, a process model, and a data model.

10. A computing device configured to implement an execution of a method for facilitating data insertion management, the computing device comprising:
a processor;
a memory; and
a communication interface coupled to each of the processor and the memory,
wherein the processor is configured to:
detect at least one user input, the at least one user input including at least one data insertion input;
display, via a graphical user interface, at least one graphical element in response to the at least one user input, the at least one graphical element including a textual indicator and at least one user selectable option;
compile data that corresponds to the at least one user input from temporary storage based on a user confirmation via the at least one user selectable option;
retrieve, via an application programming interface, the compiled data;
determine, by using at least one model and at least one knowledge source, whether the compiled data includes at least one noncompliant data set; and
automatically initiate at least one action based on a result of the determining.

11. The computing device of claim 10, wherein the processor is further configured to compile the data that corresponds to the at least one user as plain text.

12. The computing device of claim 10, wherein, to determine whether the compiled data includes the at least one noncompliant data set, the processor is further configured to:
parse, by using the at least one model, the compiled data to identify at least one linguistic element that corresponds to at least one language, the at least one linguistic element including at least one from among a word, a phrase, and a computer code;
determine, by using the at least one model, a context for each of the at least one linguistic element; and
determine, by using the at least one model and the at least one knowledge source, whether each of the at least one linguistic element includes the at least one noncompliant data set based on the corresponding context.

13. The computing device of claim 12, wherein the at least one noncompliant data set includes information that relates to at least one from among personally identifiable information and proprietary business information.

14. The computing device of claim 10, wherein the at least one action includes at least one from among a termination action, a further review action, and an allowed action, the further review action corresponding to a determination that the compiled data includes potentially noncompliant data.

15. The computing device of claim 14, wherein, to automatically initiate the further review action, the processor is further configured to:
automatically generate at least one ticket, the at least one ticket including information that relates to at least one from among the result of the determining, the compiled data, user data, and the potentially noncompliant data;
identify at least one responsible party based on the information in the at least one ticket, the at least one responsible party including at least one from among a supervisor, a manager, and a compliance team; and
transmit the at least one ticket to the identified at least one responsible party.

16. The computing device of claim 15, wherein the processor is further configured to:
receive feedback data from the at least one responsible party; and
update the at least one model and the at least one knowledge source based on the feedback data and the information in the at least one ticket.

17. The computing device of claim 16, wherein, to update the at least one model and the at least one knowledge source, the processor is further configured to:
identify, from the received feedback data, at least one pattern for each of the at least one responsible party, the at least one pattern relating to at least one from among an approval pattern and a rejection pattern;
associate the at least one pattern with the corresponding at least one responsible party; and
update the at least one model and the at least one knowledge source based on the association and the at least one pattern.

18. The computing device of claim 10, wherein the at least one model includes at least one from among a machine learning model, a natural language processing model, a statistical model, a mathematical model, a process model, and a data model.

19. A non-transitory computer readable storage medium storing instructions for facilitating data insertion management, the storage medium comprising executable code which, when executed by a processor, causes the processor to:
detect at least one user input, the at least one user input including at least one data insertion input;
display, via a graphical user interface, at least one graphical element in response to the at least one user input, the at least one graphical element including a textual indicator and at least one user selectable option;
compile data that corresponds to the at least one user input from temporary storage based on a user confirmation via the at least one user selectable option;
retrieve, via an application programming interface, the compiled data;

determine, by using at least one model and at least one knowledge source, whether the compiled data includes at least one noncompliant data set; and automatically initiate at least one action based on a result of the determining.

20. The storage medium of claim 19, wherein the at least one action includes at least one from among a termination action, a further review action, and an allowed action, the further review action corresponding to a determination that the compiled data includes potentially noncompliant data.

* * * * *